United States Patent [19]
Hebert et al.

[11] Patent Number: 5,840,156
[45] Date of Patent: Nov. 24, 1998

[54] FROTH FLOTATION PROCESS FOR DEINKING WASTEPAPER USING MULTIFLOW PRESSURIZED DEINKING MODULE

[75] Inventors: Richard P. Hebert, Cherry Valley; David B. Grimes, Greenfield, both of Mass.

[73] Assignee: Beloit Technologies, Inc., Wilmington, Del.

[21] Appl. No.: 834,606

[22] Filed: Apr. 14, 1997

[51] Int. Cl.⁶ .................................................. D21C 5/02
[52] U.S. Cl. ...................... 162/4; 209/552; 210/221.1; 210/221.2; 210/86
[58] Field of Search ................................. 162/4; 209/164, 209/546, 552, 600; 210/104, 143, 739, 86, 115, 119, 703, 221.2, 221.1

[56] References Cited

U.S. PATENT DOCUMENTS

| | | | |
|---|---|---|---|
| 4,145,286 | 3/1979 | Bereskin et al. | 210/104 |
| 4,190,522 | 2/1980 | Trä | 209/170 |
| 4,563,274 | 1/1986 | Rothon et al. | 210/101 |
| 4,618,430 | 10/1986 | Favret, Jr. et al. | 210/703 |
| 5,273,624 | 12/1993 | Chamberlain et al. | 162/4 |

FOREIGN PATENT DOCUMENTS

| | | |
|---|---|---|
| 432928 A | 6/1991 | European Pat. Off. |
| 674040 A | 9/1995 | European Pat. Off. |

*Primary Examiner*—Stanley S. Silverman
*Assistant Examiner*—Dean T. Nguyen
*Attorney, Agent, or Firm*—Lathrop & Clark

[57] ABSTRACT

A mixture of air and paper stock made from recycled paper from which the ink particles have been chemically released is injected into a cylindrical processing vessel. Added surfactants create a foam from the air as it rises through the stock and cause the ink particles to adhere to the air bubbles, resulting in a foam containing a concentrated fraction of the ink particles with some included fibers. The foam rises to the top of the vessel, and carries with it ink particles. Additional air injection ports can be used to increase the amount of foam generated and the amount of ink removed. Flow of stock and foam from the vessel can be controlled by adjusting valves on the stock and foam outlets. Flotation sensors allow the foam head to be maintained at the stock level by controlling the rate foam is withdrawn through the foam outlets.

20 Claims, 2 Drawing Sheets

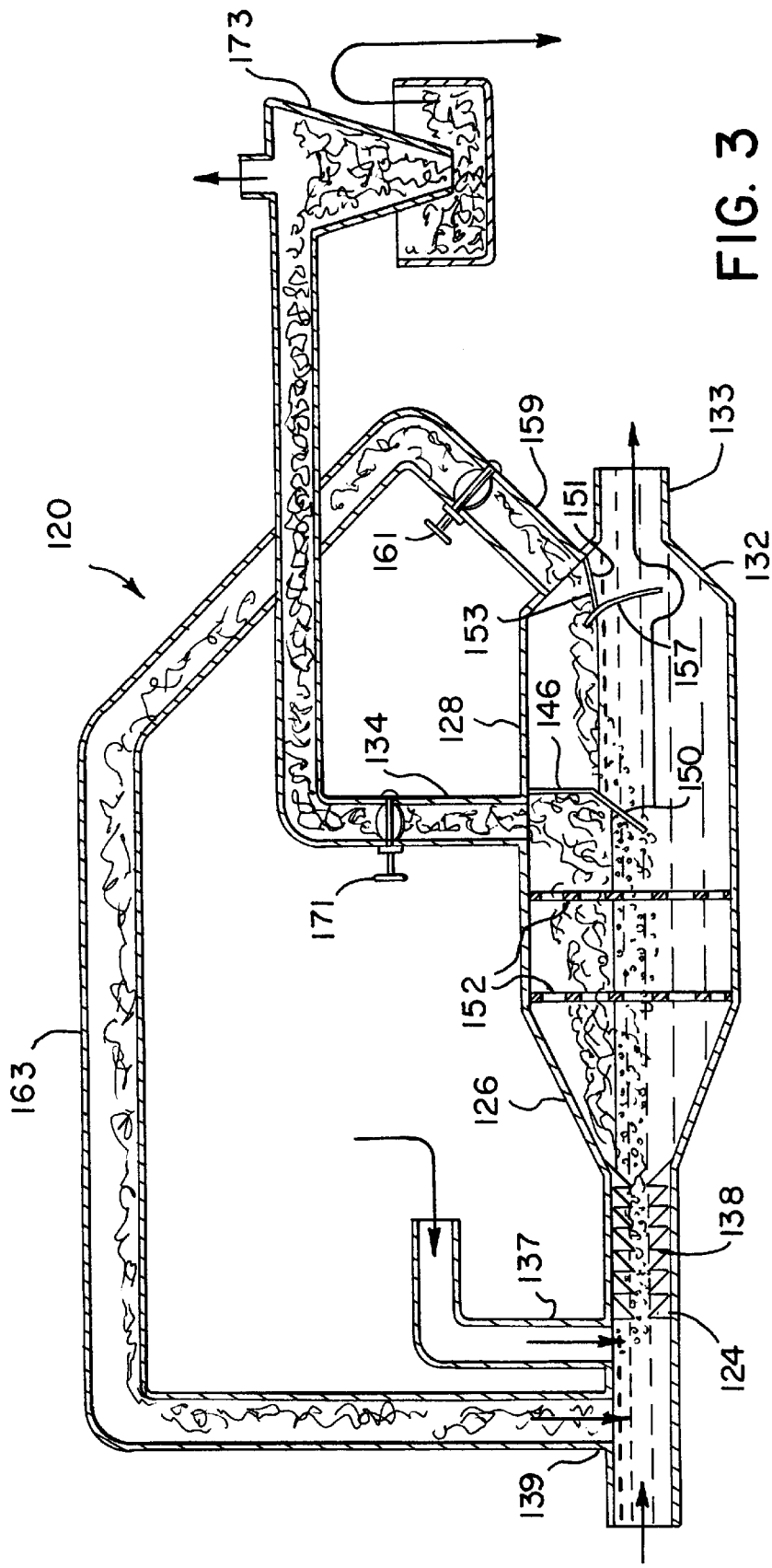

FROTH FLOTATION PROCESS FOR DEINKING WASTEPAPER USING MULTIFLOW PRESSURIZED DEINKING MODULE

FIELD OF THE INVENTION

The present invention relates generally to froth floatation separation and has particular use in the field of deinking of paper in a process for recycling waste paper. More specifically, the invention relates to an apparatus and method for separating ink-laden foam from a slurry of papermaking stock.

BACKGROUND OF THE INVENTION

The manufacture of paper from recycled paper waste, especially post-consumer waste, has become a major industry. Recycling efforts throughout the United States have made large quantities of recycled paper available. This, combined with the high cost of virgin wood fibers, has raised the economic importance of paper manufactured from recycled fibers.

The value of the paper manufactured from recycled fiber, like the value of paper manufactured from virgin fiber is dependent on the mechanical properties of the paper and the appearance of the paper. Appearance is chiefly measured in terms of brightness or lack of dark material in the paper manufactured from recycled fiber.

Of course the principal use of paper is for printing and the vast majority of all printed inks are based on carbon particles. Thus a pulp manufactured from recycled paper is typically contaminated with a substantial amount of particulate carbon. The carbon from printer's ink is chemically detached from the fiber and must be mechanically separated from the fiber if a high quality sheet is to be manufactured from the recycled stock.

There are three basic ways of cleaning recycled stock: washing the stock, using floatation separation techniques, and using hydrocyclones. Generally all three techniques are used.

Floatation separation techniques can be particularly advantageous, especially the techniques such as those disclosed in U.S. Pat. No. 5,273,624 which is incorporated herein by reference. The U.S. Pat. No. 5,273,624 shows how a sealed floatation chamber allows the use of vacuum or pressure within the chamber to simplify the collection and removal of the foam containing the carbon particles.

In general the floatation technique (long utilized in the mining industry) utilizes surfactants and various chemical additives to produce a stable foam or froth. The surfactants preferentially attach to the material to be separated and to the surface of a bubble of air, thus attaching the carbon particle to air bubbles introduced into the stock. The air rises through the pulp stock and is removed along with the carbon particles. Unlike the mining industry, where the material floated to a surface is the desired product, the floatation material in recycling paper is a waste product. Thus the controlling goal is complete removal of carbon from the paper stock and the loss of some fiber with the carbon contamination is acceptable and even desirable.

Although the systems disclosed in the U.S. Pat. No. 5,273,624 are a significant improvement on prior systems there is considerable economic incentive and need for systems which are more compact and efficient.

SUMMARY OF THE INVENTION

The pressurized floatation system of this invention utilizes a cylindrical processing vessel which has a conical inlet and a conical outlet. A mixture of air and paper stock made from recycled paper is injected into the inlet. The recycled stock contains ink particles which have been chemically released from the wood fibers. Surfactants which have been added to the stock create a foam from the air as it rises through the stock. The surfactants encourages the ink particles to adhere to the air bubbles, resulting in a foam containing a concentrated fraction of the ink particles with some included fibers. The foam, being lighter than the surrounding stock, rapidly rises to the top of the vessel, and carries with it ink particles removed from the stock. Because the foam rises so rapidly to the top of the vessel three additional air injection ports can be used to increase the amount of foam generated and the amount of ink removed from the stock. Because the vessel operates at a pressure different from atmospheric, flow of stock and foam from the vessel can be controlled by adjusting valves on the stock outlet and foam outlets.

In order for the floatation system to function properly a head of foam must be maintained at about the level of the paper stock so that only foam is removed from the foam outlets. This is accomplished by controlling the rate at which foam is withdrawn through the foam outlets. Information to control the level of foam within the vessel is provided by floatation sensors. The flotation sensors have magnetic floats which move up and down rods which magnetically couple the floats to sensor magnets.

A system of baffles is also necessary to assure the proper functioning of the floatation system. Transverse baffles consisting of foraminous plates with numerous punched holes of about one-half inch diameter are positioned to create turbulence within the stock as it flows through the vessel. Collection baffle are positioned downstream of the foam outlets to collect foam below and in front of the foam outlets.

It is a feature of the present invention to provide a system for removing ink particles from recycled paper pulp which is more efficient.

It is another feature of the present invention to provide a system for removing ink particles from recycled paper pulp which is more compact.

It is a further feature of the present invention to provide a system for removing ink particles from recycled paper which utilizes less energy.

It is a yet further feature of the present invention to provide a system for removing ink particles from recycled paper pulp which requires a less complicated mechanical system.

Further objects, features and advantages of the invention will be apparent from the following detailed description when taken in conjunction with the accompanying drawings.

BRIEF DESCRIPTION OF THE DRAWINGS

FIG. 3 is a schematic side elevational view of an alternative embodiment pressurized floatation module of this invention.

DESCRIPTION OF THE PREFERRED EMBODIMENT

Figure 1:
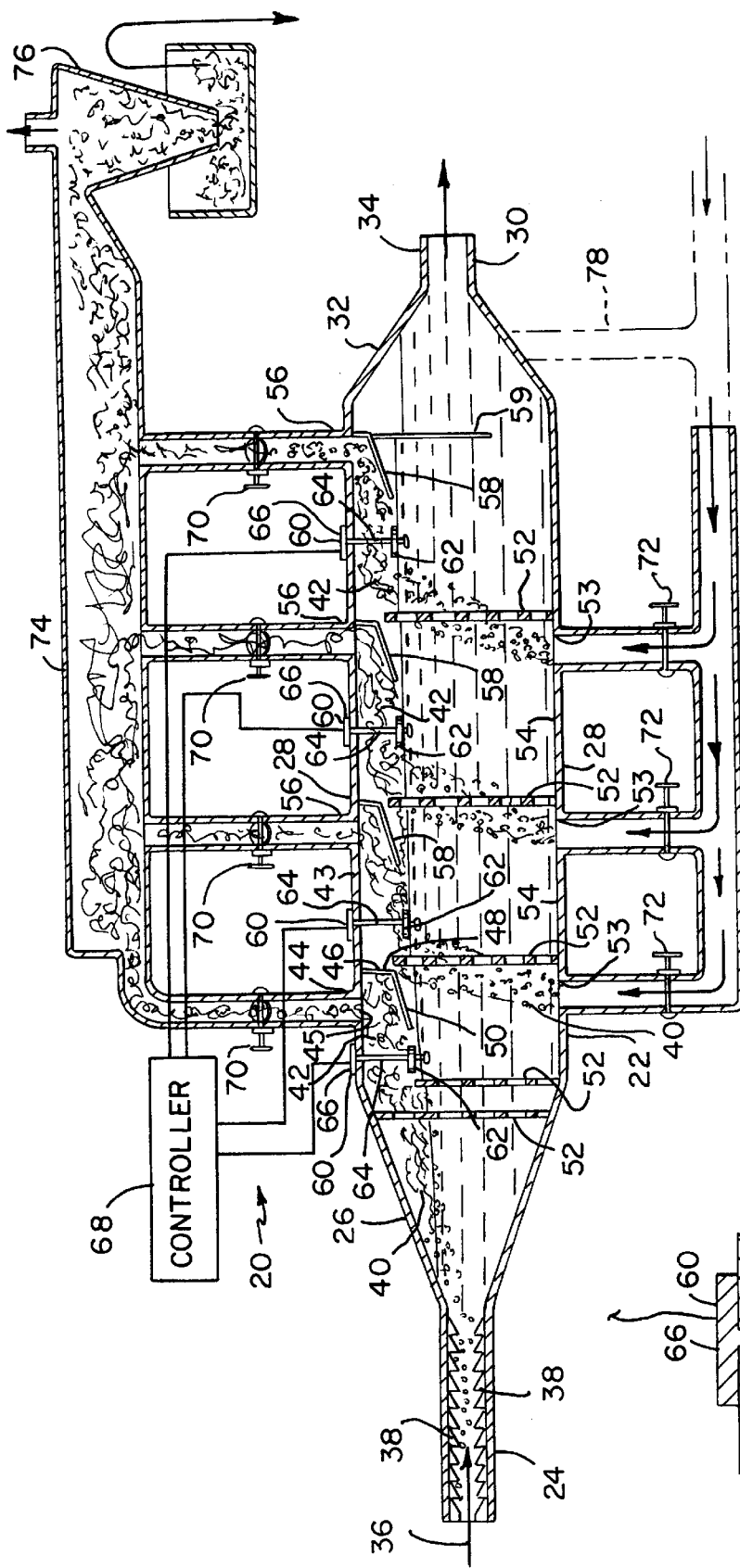
FIG. 1 is a schematic side elevational view of a pressurized floatation module of this invention.
Figure 2:
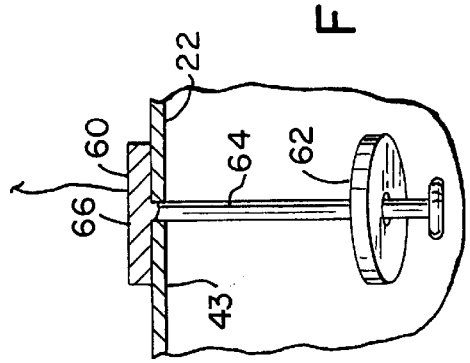
FIG. 2 is an enlarged fragmentary view of the float sensor of the apparatus of FIG. 1 taken along detail line 2—2.

Referring more particularly to FIGS. 1–3 wherein like numbers refer to similar parts, a deinking foam floatation system 20 is shown in FIG. 1. In prior art floatation models only a single air supply was utilized, thereby limiting efficiency. In the system 20 a pressurized vessel 22 is utilized with an inlet pipe 24 which is connected to a conical inlet section 26. The inlet section 26 is connected to a cylindrical body section 28. The body section 28 has a downstream outlet 30 formed by a converging conical section 32 which is connected to an outlet pipe 34.

Stock indicated by arrows 36 flows into the vessel 22 from the inlet pipe 24. The stock contains 0.5 percent to about five percent paper fiber by weight. Air is also injected into the inlet pipe 24 along with the stock. Turbulence-inducing circumferential baffles 38 in the inlet pipe 24 may be used to increase the amount of mixing between the air and the stock. The air creates a foam 40 which is substantially lighter than the surrounding stock and so will rise rapidly to the top 43 of the vessel 22 forming a surface foam 42. The surface foam 42 is drawn through the top 43 of the vessel 22 through a foam outlet pipe 44. A collection baffle 46 is positioned downstream of the outlet pipe 44 to prevent the surface foam 42 from flowing past the outlet 45 presented by the pipe 44. The collection baffle 46 has two sections: a downwardly extending section 48 and an upstream extending section 50. The collection baffle 46 creates a quiescent region isolated from the flow of stock through the vessel 22 where surface foam 42 may accumulate.

Foraminous plates are positioned within the body section 28 to define transverse battles 52 which serve to mix the foam throughout the stock, thus assuring that all the stock comes in contact with the air bubbles making up the foam 40.

Because the foam 40 is so much lighter than the stock, it rises relatively rapidly through the stock. This rising of the foam provides the opportunity to inject additional air into the vessel to increase the amount of ink particles which are removed from the stock as it passes through the vessel 22.

Additional air injection ports 53 shown in FIG. 1 are spaced along the bottom 54 of the vessel 22. Each injection port 53 may extend into the volume of the vessel 22 to position the air inlet within the cylindrical body portion 28 more or less spaced from the top 43 of the vessel 22. Above and downstream of each injection port 53 is a foam outlet pipe 56 and a corresponding outlet baffle 58. A stock outlet baffle 59 extends downwardly from the foam outlet baffle 58 nearest the stock outlet 30.

Control of the rate at which foam is drawn from the vessel 22 is critical if foam and not stock is to be withdrawn. To accomplish this function a series of sensors 60. shown in FIGS.1–2, is positioned one in front of each foam outlet 44, 56. These sensors 60 consist of a magnetic float 62 which moves along a magnetically active rod 64 which passes through the top 43 of the vessel 22 and connects with a sensing magnet 66. The position of the magnetic float 62 along the rod 64 affects the properties of the sensing magnet 66 exterior to the vessel 22. A controller 68 receives information about the position of the magnetic floats and uses this information to control the position of a series of valves 70 which control the amount of foam which is drawn off from the top of the vessel 22. The controller also controls the amount of stock flowing to the vessel 22 and/or the amount of air injected into the vessel. Injected air is controlled by adjustment of valves 72 in the air inlet lines leading to the air injection ports 53.

The precise location of the interface between the surface foam 42 and the stock may be somewhat indistinct because air bubbles are also moving up through the stock. Thus the magnetic floats 62 must be sufficiently light, that is of a sufficiently low specific gravity, that they will float in stock even though some air is reducing the density of the stock locally.

Because the vessel 22 is sealed, the movement of the surface foam 42 from the vessel 22 into the outlet pipes 44, 56 is affected by system pressure or by a vacuum drawn on the foam outlets 44, 56. Preferably pressures above atmospheric will be used as this minimizes the amount of equipment required and reduces costs, as vacuum equipment is typically more expensive to operate then compressing equipment.

The outlet pipes 44, 56 may be connected to a header 74 and lead to a cyclone 76. The cyclone separates the air from the foam leaving a waste stream containing some fiber together with the ink particles suspended in water. A twin-wire press (not shown) is used to dewater the waste stream which is then disposed of, typically as boiler fuel.

The deinking system 20 may alternatively be outfitted with a stock infeed header 78, as shown in phantom view in FIG. 1, which allows the recirculation of part of the feed stock which is injected along with the air through the injection ports 53.

It may be desirable to withdraw the stock from the vessel 22 and mix it with air in a mixer before injecting the stock and air into the vessel 22. This may be accomplished with a pump and mixer, the pump supplying the means for withdrawing the stock and injecting the stock after it has been mixed with air.

Yet another variation on the system 20 shown in FIG. 1 is to inject the air from the top 43 or the sides of the cylindrical section of the vessel 22 with or without recirculated stock with the injected air.

An alternative embodiment deinking system 120 is shown in FIG. 3. This system is an improvement on the device shown in FIG. 2 of the U.S. Pat. No. 5,273,624. The deinking system 120 has an inlet pipe 124 which has circumferential turbulence-generating baffles 138, downstream of an air injection port 137 and a foam recirculation port 139. The air injection port 137 and the foam recirculation port mix air and recirculated foam into the inlet 124. The inlet pipe 124 leads to a conical inlet section 126 which is followed by a cylindrical body section 128. Foraminous baffles 152 extends across the cylindrical body 128 and help mix the air with the stock. A foam outlet pipe 134 is positioned approximately in the middle of the cylindrical body section 128 of the vessel 122. A foam collection baffle 146 is positioned downstream of the foam outlet 134. The foam collection baffle 146 extends across the cylindrical section 128 and down to just above the geometric center of the cylindrical section and a portion 150 of the baffle then extends upstream beneath the outlet 134. The baffle section 150 extends downwardly to approximately the centerline of the cylindrical body section 128.

The cylindrical body section 128 ends in a conical section 132. The conical section 132 has an outlet 133 for the cleaned stock. This outlet 133 is covered by a two part baffle 151. The two part baffle 151 has a first part 153 which extends almost directly upstream from the outlet 132 and forms a shelf which collects any foam which passes by the foam collection baffle 146. Depending from the shelf is a second portion 157 of the baffle 151 which blocks the entrance to the outlet 133 forcing the stock to flow down and under the baffle portion 157.

A recirculation port 159 is positioned above the foam collection portion 153 of the baffle 151. The recirculation port 159 opens to a recirculation line 163 which has a valve 161 which controls the amount of stock which is recirculated to the foam recirculation port 139 at the inlet 124 of the vessel 122. Flow through the foam outlet pipe 134 is controlled by a valve 171 and leads to a cyclone 173 which separates the water, fiber and ink particles from the air. A sensor to monitor the interface between the surface foam 142 and the stock in the vessel 122 is not required because the valve 161 can be adjusted so the flow of material through the foam outlet pipe is of the desired consistency. However a floatation sensor could be employed if desired.

It should be understood that a deinking system 20 such as shown in FIG. 1 might typically have an inlet pipe 30 which is twenty-four inches in diameter and ten feet long and connect to a vessel 22 which has a cylindrical body section 32 which is about eighty-two inches in diameter and about twenty-five feet long. Typical flow in such a unit may be about 6,000 gallons per minute.

It should be understood that although the air injection ports 53 in FIG. 1 are shown positioned to inject air near the bottom 54 of the vessel 22, the injection ports may extend upwardly into the vessel 22 part way towards the top 43 of the vessel 22. Alternatively the injection ports 53 may extend downwardly from the top of the vessel 22 some distance towards the bottom 54 of the vessel 22.

It should be understood that the air which is injected into the vessel 22 can be mixed with the stock inside the vessel or the air can be mix with the stock outside the vessel and the air and stock injected premixed into the vessel.

It is understood that the invention is not limited to the particular construction and arrangement of parts herein illustrated and described, but embraces such modified forms thereof as come within the scope of the following claims.

We claim:

1. In a froth floatation process for separating ink particles from a fibrous pulp stock, wherein gas is dispersed in the stock to generate bubbles which rise through the stock and form a surface foam containing a higher concentration of said ink particles, the improvement comprising:

providing an enclosed vessel having a bottom, a top, a stock inlet, a stock outlet and said vessel having a plurality of foam outlets communicating with the top of the vessel;

feeding a stock of paper pulp containing ink particles through the enclosed vessel from the stock inlet to the stock outlet;

mixing air with the stock and injecting the air at a plurality of air injection locations within the vessel to generate a foam;

allowing the foam to float to the top of the vessel to form a surface foam;

removing the surface foam at the plurality of foam outlets, each outlet being spaced along the top of the vessel, and spaced downstream towards the stock outlet from at least one of said plurality of air injection locations;

measuring the location of an interface between the stock and the surface foam at a plurality of locations between the stock inlet and the stock outlet;

and controlling the flow of stock through the vessel and the injection of air and removal of surface foam so that each measured interface between the surface foam and the stock is maintained spaced from the top of the vessel.

2. The method of claim 1 wherein the foam flows to each outlet along a baffle spaced away from each foam outlet towards the stock outlet and extending from the top of the vessel to approximately the interface between the surface foam and the stock.

3. The method of claim 2 wherein the foam flows along each baffle towards the stock outlet before flowing through each outlet.

4. The method of claim 1 wherein the stock flows through the vessel along a path having a circular cross section and wherein the stock flows from an inlet along a path having a conical transition section.

5. The method of claim 4 wherein the stock as it approaches the outlet transitions from the path having a circular cross section to a path having a converging conical transition section.

6. The method of claim 1 wherein air is injected at three locations.

7. The method of claim 1 wherein a portion of the stock flowing through the vessel is withdrawn mix with the stock external to the container and reinjected with the air at the injection locations.

8. The method of claim 1 wherein the interface between the stock and the surface foam is measured next to each foam outlet at a position towards the stock inlet, and wherein the amount of foam withdrawn from each outlet is controlled in response to the location of the interface between the stock and the foam as measured next to each foam outlet.

9. The method of claim 8 wherein the step of measuring the interface between the stock and the surface foam is accomplished by measuring the position of a float in front of each foam outlet with respect to the top of the vessel and wherein the step of removing the surface foam from each outlet includes the step of controlling the amount withdrawn from each outlet in response to the location of the interface between the stock and the foam as measured by the float in front of each outlet.

10. The method of claim 1 wherein the step of measuring the location of an interface between the stock and the surface foam is accomplished by measuring the location of a float of a selected specific density which is located within the vessel and is substantially constrained to move in a substantially vertical direction.

11. In a froth floatation process for separating ink particles from a fibrous pulp stock, wherein gas is dispersed in the stock to generate bubbles which rise through the stock and form a surface foam containing a higher concentration of said ink particles, the improvement comprising:

providing an enclosed vessel having a bottom, a top, a stock inlet, a stock outlet and a plurality of foam outlets communicating with the top of the vessel;

mixing a paper stock created from recycled paper, the stock containing between about 0.5 percent and about 5 percent fiber with one or more reagents that are capable of supporting formation of a foam for attaching ink particles to walls formed by bubbles making up the foam;

feeding a stock of paper pulp containing ink particles through the enclosed vessel from the stock inlet to the stock outlet;

mixing air with the stock at a plurality of air injection locations within the vessel to generate the foam;

allowing the foam to float to the top of the vessel to form a surface foam;

removing the surface foam at the plurality of foam outlets, each outlet being spaced along the top of the vessel, and spaced downstream towards the stock outlet from at least one of said plurality of air injection locations;

measuring the location of an interface between the stock and the surface foam at a plurality of positions within the vessel; and controlling the flow of stock through the vessel and the injection of air and removal of surface foam so that each measured interface between the surface foam and the stock is maintained spaced from the top of the vessel.

12. The method of claim 11 wherein the foam flows to each outlet along a baffle which is spaced away from each foam outlet towards the stock outlet and extending from the top of the vessel to approximately the interface between the surface foam and the stock.

13. The method of claim 12 wherein the foam flows along each baffle towards the stock outlet before flowing through each outlet.

14. The method of claim 11 wherein the stock flows through the vessel along a path having a circular cross section and wherein the stock flows from an inlet along a path having a conical transition section.

15. The method of claim 14 wherein the stock as it approaches the outlet transitions from the path having a circular cross section to a path having a converging conical transition section.

16. The method of claim 11 wherein air is injected at three locations.

17. The method of claim 11 wherein a portion of the stock flowing through the container is withdrawn and reinjected with the air at the injection locations.

18. The method of claim 11 wherein the step of determining the interface between the stock and the surface foam is accomplished by measuring next to each foam outlet at a position towards the stock inlet, and wherein the amount of foam withdrawn from each outlet is controlled in response to the location of the interface between the stock and the foam as measured next to each foam outlet.

19. The method of claim 18 wherein the interface between the stock and the surface foam is measured by a float in front of each foam outlet towards the stock inlet, and wherein the amount of foam withdrawn from each outlet is controlled in response to the location of the interface between the stock and the foam as measured by the float in front of each outlet.

20. The method of claim 11 wherein the step of measuring the location of an interface between the stock and the surface foam is accomplished by measuring the location of a float of a selected specific density which is located within the vessel and is substantially constrained to move in a vertical direction.

* * * * *